(12) United States Patent
Saquet et al.

(10) Patent No.: US 6,709,505 B2
(45) Date of Patent: *Mar. 23, 2004

(54) UNIVERSAL PAINT SOLVENT

(75) Inventors: Xenophon G. Saquet, Troy, MI (US); Jeffrey Maxwell, White Lake, MI (US); Stephen Summerfield, Macomb, MI (US)

(73) Assignee: Gage Products Company, Ferndale, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/350,607

(22) Filed: Jan. 24, 2003

(65) Prior Publication Data

US 2003/0131760 A1 Jul. 17, 2003

Related U.S. Application Data

(62) Division of application No. 09/927,283, filed on Aug. 10, 2001, now Pat. No. 6,517,626.
(60) Provisional application No. 60/225,125, filed on Aug. 14, 2000.

(51) Int. Cl.[7] .............................. B08B 3/08; C23G 5/032
(52) U.S. Cl. ......................... 106/311; 134/38; 252/364
(58) Field of Search ............................. 106/311; 134/3, 134/38; 252/364

(56) References Cited

U.S. PATENT DOCUMENTS

| | | | |
|---|---|---|---|
| 4,395,348 A | * 7/1983 | Lee ............................. 510/176 |
| 4,844,832 A | * 7/1989 | Kobayashi et al. ......... 510/176 |
| 4,944,893 A | * 7/1990 | Tanaka et al. .............. 510/176 |
| 4,992,108 A | 2/1991 | Ward et al. .................... 134/38 |
| 5,354,788 A | 10/1994 | Johnson et al. ............. 523/145 |
| 5,863,346 A | * 1/1999 | Michelotti ...................... 134/3 |
| 5,993,561 A | 11/1999 | Jarema ........................ 134/7 |
| 6,040,284 A | 3/2000 | Marquis et al. ............. 510/201 |
| 6,169,061 B1 | 1/2001 | Machac, Jr. et al. ........ 510/201 |
| 6,197,124 B1 | 3/2001 | Nakayama ................... 134/38 |
| 6,250,317 B1 | 6/2001 | Nakayama ................... 134/38 |
| 6,346,497 B1 | 2/2002 | Nakamura et al. .......... 501/138 |
| 6,517,626 B2 * | 2/2003 | Saquet et al. ............... 106/311 |

OTHER PUBLICATIONS

Material Safety Data Sheet for Dynasolve 218 (Feb. 10, 2000).
Material Safety Data Sheet for Dynasolve 230 (Dec. 3, 1998).
Material Safety Data Sheet for Dynasolve 225 (Dec. 3, 1998).
Material Safety Data Sheet for Dynasolve 220 (Dec. 3, 1998).
Material Safety Data Sheet for Dynasolve 210 (Dec. 3, 1998).
Technical Data Sheet for Dynasolve 210/220/225/230 (Feb. 7, 2000).
Technidal Data Sheet for Dynasolve 218 (Dec. 15, 1999).

* cited by examiner

*Primary Examiner*—David Brunsman
(74) *Attorney, Agent, or Firm*—Gifford, Krass, Groh, Sprinkle, Anderson & Citkowski, P.C.

(57) ABSTRACT

A universal paint solvent comprises, on a weight basis, 1–30% of an acidic material selected from the group consisting of sulfonic acids, phosphonic acids, phosphoric acids, and combinations thereof, together with 10–80% of an organic solvent selected from the group consisting of alcohols, ethers, ketones, aldehydes, esters, and combinations thereof. In particular compositions, the acidic component is comprised of a mixture of two different acids. Alkyl esters, particularly acetate esters, are preferred organic solvents. Butyl acetate is a specifically preferred solvent. The compositions solvate a large variety of different paint formulations, and are effective at room temperature. The compositions have particular utility for cleaning paint delivery systems and equipment.

11 Claims, No Drawings

UNIVERSAL PAINT SOLVENT

RELATED APPLICATIONS

This patent application is a divisional of U.S. patent application Ser. No. 09/927,283 filed Aug. 10, 2001 now U.S. Pat. No. 6,517,626, which claims priority of provisional patent application Ser. No. 60/225,125 filed Aug. 14, 2000, and entitled "Universal Paint Solvent."

FIELD OF THE INVENTION

This invention relates generally to compositions for dissolving paint. More specifically, it relates to a composition which can solvate a wide variety of dried paints at room temperature.

BACKGROUND OF THE INVENTION

Painting is an important step in the manufacture of a wide variety of articles. In a mass production setting, painting is often carried out by high speed processes such as spray painting or dip coating, wherein workpieces are sequentially carried through a series of painting stations. The cleaning of dried paint residues from conveyors, carriers and paint station equipment is a significant and ongoing concern of manufacturers. This problem is further compounded by the fact that in the manufacture of motor vehicles and many other items, a number of different paint formulations are employed. For example, automobiles are typically coated with one or more primer layers, a base color layer, and a top clear coat. These various paint formulations are often very different in composition and may be provided by a number of different suppliers. As a consequence, the cleaning of dried paint films from such equipment can be very difficult, since the solubility properties of the various dried paint films can differ to a very large extent.

It will be understood from the foregoing that there is a need, in the manufacturing industry, for a solvent material which is capable of dissolving dried films of a variety of paint compositions. It is also necessary that any such composition be relatively low in toxicity, safe to handle, and non-damaging to the equipment.

It is a significant feature of the present invention that the compositions have "universal" applicability; that is to say, the compositions of the present invention are capable of dissolving a wide variety of dried paints including water-based and solvent-based formulations, primers, base coats, clear coats and metallic paints. It is also significant that the present compositions will effectively dissolve paints at ambient temperatures. Prior art compositions are generally capable of only addressing relatively narrow ranges of paint compositions; and as a consequence, a manufacturer often needed to employ a large number of different compositions in a manufacturing process. Furthermore, prior art compositions often had to be used at elevated temperatures in order to be effective. Thus, it will be seen that the present invention secures a number of advantages not achievable in the prior art.

The compositions of the present invention can be formulated with volatile organic compound (VOC) exempt solvents such as acetone, methyl acetate and the like.

In addition, the compositions of the present invention are rinsible with water or solvents and are fast acting. As a result of the foregoing, compositions in accord with the present invention have particular utility for cleaning painting equipment used in the manufacture of motor vehicles. Such equipment typically includes a large number of separate paint delivery lines, pumps, tanks and the like. Compositions of the present invention can be pumped through paint delivery systems, and they reliably remove all paint residues therefrom. Following cleaning, the compositions can be easily rinsed from the paint delivery systems. The compositions of the present invention actually dissolve paint residues, and as such have greater utility than do paint stripper compositions which merely swell and lift paint films.

BRIEF DESCRIPTION OF THE INVENTION

There is disclosed herein a universal paint solvent which comprises, on a weight basis, 1–30% of an acidic material which is selected from the group consisting of sulfonic acids, phosphonic acids, phosphoric acids, and combinations thereof. The composition further includes 10–80% of an organic solvent which is selected from the group consisting of alcohols, esters, ketones, aldehydes, ethers, aromatic hydrocarbons, and combinations thereof. The composition may also include, on a weight basis, up to 10% of an additive selected from the group consisting of: amine ethers, surfactants, and combinations thereof. In specifically preferred embodiments, the acidic material is comprised of a mixture of two different acidic materials, and in one specific group of formulations, the acidic material is comprised of a mixture of a toluene sulfonic acid and a xylene sulfonic acid. The organic solvent, in particular embodiments, comprises an alkyl ester; which in specifically preferred embodiments comprises an ester of a $C_1$–$C_5$ acid and a $C_1$–$C_5$ alcohol. Butyl acetates comprise one particularly preferred ester, with n-butyl acetate being specifically preferred.

Also disclosed herein are methods for dissolving paint from articles, including paint delivery systems. The method comprises contacting the article with the universal paint solvent of the present invention. It is notable that the method may be practiced at room temperature, which in the context of this disclosure is understood to mean a temperature in the approximate range of 40° F. to 120° F.

DETAILED DESCRIPTION OF THE INVENTION

The present invention is directed to a universal paint solvent; that is to say, a composition which is capable of dissolving a large number of different paint compositions. In the context of this disclosure, all compositions are given on a weight basis, and the composition of the present invention in general includes 1–30% of an acidic material selected from the group consisting of sulfonic acids, phosphoric acids and phosphonic acids. The composition further includes an organic solvent in an amount of approximately 10–80%. The organic solvent comprises one or more of alcohols, ketones, aldehydes, esters, and ethers. The compositions of the present invention can also include ancillary ingredients such as surfactants, corrosion inhibitors and amine ether compounds. The compositions can also include fragrances, coloring agents, thickenings agents and the like.

The acidic materials are most preferably organic based materials, and among some of the preferred sulfonic acids are toluene sulfonic acid (TSA), xylene sulfonic acid (XSA), methane sulfonic acid (MSA), and similar materials. Such materials are well known in the art, and are available from a number of suppliers, typically as an aqueous or non-aqueous solution of 60% to 90% strength. Organophosphonic acids are also useful in the present invention and one such material comprises diethylenetriaminepenta (methylenephosphonic acid), and this material is sold by the Monsanto chemical corporation under the name Dequest® 2060. Some other phosphonic acids having utility in this invention comprise 1-hydroxyethylidene bis-phosphonic acid, sold by the Monsanto corporation under the name Dequest® 2010, as well as the material sold by the Monsanto corporation under the designation Desquest® 2000 which comprises aminotri(methylenephosphonic acid). Other organophosphonic acids may be employed in the present invention. Phosphoric acid compositions may also be employed in the present invention, and one such material is available from the Rhodia chemical company under the designation Rhodafac PEH, and this material comprises the 2-ethylhexyl ester of phosphoric acid. Another material having utility is also available from the Rhodia corporation under the name Rhodafac RP-710, and this material comprises a polyethylene phenyl ether phosphate. Other similar materials may likewise be employed.

It has been found that, in some instances, there is particular advantage attendant upon the use of a mixture of acidic materials in the compositions of the present invention. Compositions which include multiple acidic materials have been found particularly effective in dissolving a broad spectrum of paints.

The compositions of the present invention also include an organic solvent. Generally, the solvent comprises 10–80% of the mixture. In certain preferred embodiments, the solvent comprises at least 30% of the mixture; and, in specific preferred embodiments, the solvent comprises 30–60% of the mixture. Typically the solvents are selected from the group consisting of alcohols, esters, ketones, aldehydes and ethers. Some specific solvents comprise alkyl acetate esters such as butyl acetates, and n-butyl acetate and t-butyl acetate are particularly preferred solvents. Other solvent materials comprise ketones such as methyl ethyl ketone, methyl isobutyl ketone, acetone and the like. In some instances, alcohols, such as isopropyl alcohol, have utility in the present invention. In other instances, aromatic solvents such as xylene, toluene and the like may be employed. In many instances, commercial solvent mixtures and compositions such as the aromatic hydrocarbon mixtures sold by the Shell corporation under the designation Cyclosol, and the like may be employed.

The compositions may also include various additives such as surfactants and the like which have been found to further accelerate cleaning action of the compositions. One such group of materials comprises ether amines having the general formula R—O—$CH_2CH_2CH_2NH_2$ wherein R comprises straight or branched hydrocarbons. Such materials are available from the Tomah corporation of Milton, Wis. under the designation PA. Particularly preferred-materials of this type comprise the PA-10 amine wherein R is a branched $C_6H_{13}$ material; and the PA-19 product wherein R is a linear $C_{12}$ to $C_{15}$ hydrocarbon. Cyclic ether amines, such as morpholines, can also be employed in this invention. Other ether amines, including diamine materials such as the DA series materials sold by the Tomah corporation, may be likewise employed.

While the ether amine materials can function as surfactants or co-solvents, compositions of the present invention may also include other surfactants, both ionic and nonionic. One such material comprises a sodium 2-ethylhexyl sulfate sold by the Rhodia corporation under the designation Rhodapon BOS. One nonionic surfactant which can be employed in the present invention is sold by the Rhone-Poulenc corporation under the designation Geropon SS-0-75. Other surfactants may be similarly employed. Typically, the surfactants and/or amine ethers are employed in relatively small amounts, typically in 0.5–5% by weight.

One particularly preferred group of compositions comprises 60–90% n-butyl acetate, 0.5–5% of the Rhodapon BOS surfactant, 0.5–5% of the PA-10 surfactant, 5–15% of a 65% aqueous solution of toluene sulfonic acid and 5–15% of a 90% aqueous solution of xylene sulfonic acid. It has been found, in compositions of this type, that the two separate sulfonic acids interact synergistically to produce a composition which can dissolve a wide variety of aqueous and non-aqueous paint compositions.

One specific formulation referred to herein as Composition 1 was made in accord with the foregoing, and comprises 80% n-butyl acetate, 1% of the Rhodapon BOS surfactant, 1% of the Tomah PA-10 amine ether, 9% of a 65% solution of toluene sulfonic acid, and 9% of a 90% aqueous solution of xylene sulfonic acid. This composition is found to have excellent solvating properties for a large number of diverse paint formulations. Another similar composition was prepared from 6.65 grams of n-butyl acetate, 21.8 grams of a commercial aromatic hydrocarbon solvent sold by the Shell corporation under the designation Cyclosol 53, 11.5 grams of isopropyl alcohol, 0.5 grams of the Rhodapon BOS surfactant, 0.5 grams of the PA-10 amine ether, 4.46 grams of the 65% solution of toluene sulfonic acid, and 4.46 grams of the 90% solution of xylene sulfonic acid. This material is designated as Composition 2.

Another specific formulation in accord with the present invention comprises 86% of n-butyl acetate, 1% of the Tomah PA-10 amine ether, 7.0% of a 65% solution of toluene sulfonic acid, and 4.5% of a 90% solution of xylene sulfonic acid, both acids being in a methanol solution. The composition further includes 0.5% n-methyl morpholine. This formulation preferably includes less than 1.0% of corrosion inhibitors such as Mona AT-1200 which is available from Mona Industries. A vapor phase corrosion inhibitor such as dicyclohexylamine nitrite is also helpful in reducing vapor phase corrosion in steel tanks.

Solution tests were conducted to evaluate the effectiveness of specific compositions of the present invention. The salvation tests were carried out on 31 different paint formulations of the type encountered in the manufacture of motor vehicles. These paints included topcoats, primers, and a variety of colors, including metallics. The paints were both water based and solvent based. In general, the solvating power of the compositions was tested by coating 0.5 grams of each paint into a glass vial of approximately 10 milliliter capacity, and drying the paint for approximately 5 hours at 180° F. to produce a dried paint film characteristic of that which might be encountered in a typical industrial application. The paint coated vials were then filled with approximately 5 grams of various compositions which were being tested. The vials were then shaken for 4 hours, at room temperature, at the rate of 150 cycles per minute, after which the vials were visually inspected to note the degree of dissolution of the paint film. In most instances, after observation, the vials were then flushed with isopropyl alcohol (or in some instances an aqueous/surfactant solution) and reevaluated to see if any remaining paint film was adherent thereto. The number of dissolved paints are noted for each composition.

Review of the solvation data makes clear that a variety of organic solvents may be employed in the practice of the present invention. Many of the preferred formulations include butyl acetate therein, and this material has been found to be a good solvent for both polar and nonpolar compounds. For example, Composition 1 is based on butyl acetate, and in the solvation test it dissolved 18 different paints. However, other solvent materials including alcohols and aromatic hydrocarbons also have significant utility in the present invention. Composition 2, which includes major amounts of aromatic solvents and isopropyl alcohol, dissolved 16 paints. Also apparent from the solvation data is the fact that good salvation can be obtained even when only modest amounts of acid are included in the formulation. For example, a composition generally similar to Composition 1 was prepared from 90% of n-butyl acetate, 0.5% sodium-2 ethyl hexyl sulfate and 0.5% of the Tomah PA-10 amine ether together with 4.5% of a 65% solution of toluene sulfonic acid and 4.5% of a 90% solution of xylene sulfonic acid. The total sulfonic acid content of this composition was 6.7% (which was half that of Composition 1); this composition, referred to herein as Composition 3, was found to solvate 12 different paint samples.

In accord with the present invention, it has been found that acids having a high acid strength are generally better solvent materials for paints. As is known in the art, acid strength is quantified by pKa which is the $\log_{10}$ of the ionization constant of an acid. The lower the value of the pKa, the stronger the acid, and the lower the pKa of the acid, the better its performance tends to be as a paint solvent. It has further been found in accord with the present invention that higher acid concentrations do not always give good paint salvation. In general, solvating ability of a formulation increases with increasing acid concentration up to a point, and after that salvation tends to decrease. This was illustrated by a fourth composition, which was prepared in accord with the present invention. This composition was generally similar to Compositions 1 and 3 and comprised on a weight basis 70% n-butyl acetate, 1.5% of the Rhodapon BOS surfactant and 1% of the Tomah PA-10 amine either. Composition 4 included 13.5% each of the toluene sulfonic acid and xylene sulfonic acid. This composition was found to solvate 15 different paint samples.

In general, the acid will comprise 1 to 30% of the composition, and in particular embodiments, the acid component will comprise 10 to 20% of the composition. It has further been found in accord with the present invention that compositions which include two or more acid components generally give better performance, as measured by the number of different paints which can be dissolved, as compared to compositions having a like amount of a single acid. Therefore, the use of two acids allows for a greater range of activity of the solvent and/or allows for lesser amounts of acid to be employed. Still other formulations in accord with the present invention have been prepared and evaluated. Composition 5 comprises 38.5 parts of n-butyl acetate, 16.5 parts of isopropyl alcohol, 2.5% of the aforementioned Rhodapon BOS surfactant, 2.5% of the aforementioned Tomah PA-10 amine ether, 28.89 parts of a 90% solution of xylene sulfonic acid, and 11.2 parts of water. This composition was found to dissolve 5 different paint samples. A sixth composition, generally similar to Composition 5, was prepared. This composition did not include any of the Rhodapon surfactant, but substituted therefor 2.5 parts of a nonionic surfactant. Also, the amount of the Tomah material was increased to 5 parts in this composition. The remaining ingredients were all the same as for Composition 5. This composition was also found to solvate 5 paints. Composition 7 included 55 parts of n-butyl acetate, 10.9 parts of isopropyl alcohol, 2.5 parts of the Tomah amine ether, and 20 parts of hydroxy ethylidene 1,1 diphosphonic acid and 20 parts of p-toluene sulfonic acid (64% solution). This composition was found to solvate 4 different paints. Composition 8 included 55 parts of n-butyl acetate, 5.3 parts of isopropyl alcohol, 2.5 parts of the Rhodapon surfactant, 2.5 parts of the Tomah amine ether, 20 parts of p-toluene sulfonic acid (64% solution) and 20 parts of a 65% solution of phosphoric acid. This composition was found to solvate 5 paints. Composition 9 comprised 55 parts of n-butyl acetate, 2.5 parts each of the Rhodapon and Tomah materials, 20 parts of a 65% solution of xylene sulfonic acid, and 20 parts of a 64% solution of p-toluene sulfonic acid. This composition was found to solvate 13 different paints.

Yet other formulations of the present invention will be readily apparent to one of skill in the art. In general, the compositions of the present invention may include solvent mixtures and acids which provide a clear solution as well as those which provide emulsions or dispersions. In general, the compositions of the present invention have been found to solvate most common paint formulations, at room temperature, with contact times of less than 4 hours. In those instances where compositions are used at elevated temperatures and/or where some mechanical agitation is provided (as for example by pumping the material through a paint line system), solvation times can be greatly reduced.

Reference to specific formulations, as detailed herein, does not imply that other formulations are undesirable. Likewise, the fact that some specific materials and compositions are disclosed in this specification is not meant to imply that the invention is limited to the disclosed materials and compositions. In view of the specific teaching presented herein, one of skill in the art could readily select other materials for the practice of the present invention. Therefore, it is to be understood that the foregoing discussion, description and examples are illustrative of particular embodiments of the invention; but are not meant to be limitations upon the practice thereof. It is the following claims, including all equivalents, which define the scope of the invention.

What is claimed is:

1. A universal paint solvent comprising consisting essentially of, on a weight basis:

1–30% of an acidic material selected from the group consisting of sulfonic acids, phosphonic acids, phosphoric acids, and combinations thereof;

10–80% of an organic solvent selected from the group consisting of isopropyl alcohol, esters, ketones, aldehydes, ethers, aromatic hydrocarbons, and combinations thereof and, up to 10% of an additive selected from the group consisting of: amine ethers, surfactants, and combinations thereof.

2. The composition of claim 1, wherein said acidic material comprises a mixture of said acidic materials.

3. The composition of claim 2, wherein said acidic material comprises a mixture of two different sulfonic acids.

4. The composition of claim 1, wherein said organic solvent is selected from the group consisting of: methyl isobutyl ketone, methyl esters of fatty acids, isopropyl alcohol, n-butyl acetate, t-butyl acetate, xylene, and combinations thereof.

5. The composition of claim 1, wherein said amine ether comprises $C_6H_{13}$—O—$(CH_2)_3$—$NH_2$.

6. The composition of claim 1, further including a corrosion inhibitor.

7. The composition of claim 6, wherein said corrosion inhibitor includes a vapor phase corrosion inhibitor.

8. A method for dissolving paint from an article, said method comprising contacting said article with a solvent consisting essentially of, on a weight basis:

1–30% of an acidic material selected from the group consisting of: sulfonic acids, phosphonic acids, phosphoric acids and combinations thereof;

10–80% of an organic solvent selected from the group consisting of: isopropyl alcohol, esters, ketones, aldehydes, ethers and combinations thereof; and up to 10% of an additive selected from the group consisting of: amine ethers, surfactants, and combinations thereof.

9. The method of claim 8, wherein said article is contacted with said solvent at a temperature in the range of 40° F. to 120° F.

10. The method of claim 8, wherein said article comprises a paint delivery system.

11. The method of claim 8, wherein said acidic material comprises a mixture of two different acids.

* * * * *